Dec. 4, 1956 W. A. PENNOW 2,773,172
LIGHTING UNIT
Filed Aug. 25, 1951 6 Sheets-Sheet 1

Fig. I.

WITNESSES:
Robert Baird
Nw. L. Groome

INVENTOR
Willis A. Pennow
BY
Arthur T. Stratton
ATTORNEY

Dec. 4, 1956 W. A. PENNOW 2,773,172
LIGHTING UNIT
Filed Aug. 25, 1951 6 Sheets-Sheet 2

WITNESSES:
Robert C. Baird
Wm. C. Groome

INVENTOR
Willis A. Pennow.
BY
Arthur T. Stratton
ATTORNEY

Dec. 4, 1956  W. A. PENNOW  2,773,172
LIGHTING UNIT
Filed Aug. 25, 1951  6 Sheets-Sheet 3

WITNESSES:
Robert Baird
Nw. L. Groome

INVENTOR
Willis A. Pennow.
BY
Arthur T. Stratton
ATTORNEY

Dec. 4, 1956 W. A. PENNOW 2,773,172
LIGHTING UNIT
Filed Aug. 25, 1951 6 Sheets-Sheet 4

WITNESSES:
Robert C. Baird
Wm. L. Groome

INVENTOR
Willis A. Pennow.
BY
Arthur T. Stratton
ATTORNEY

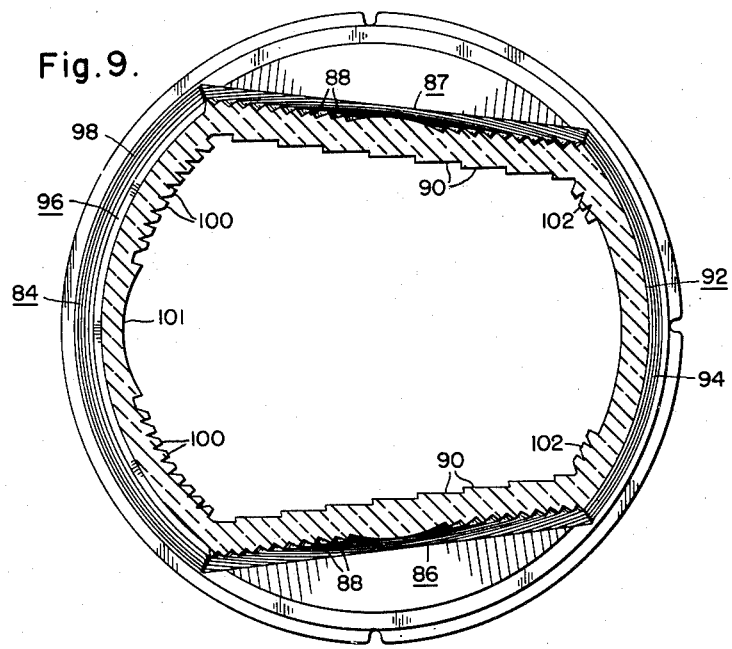
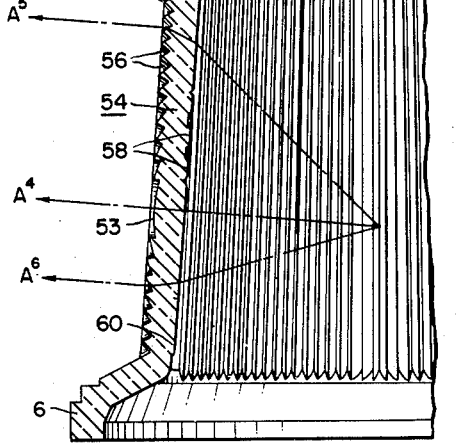
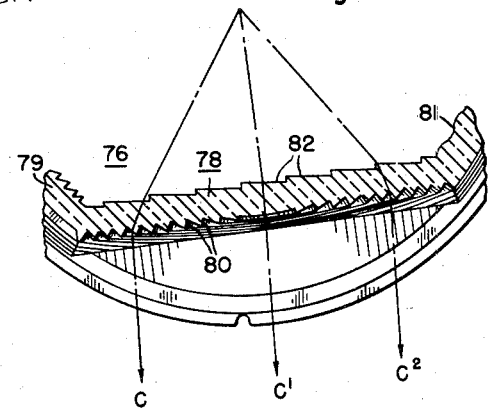

Dec. 4, 1956    W. A. PENNOW    2,773,172
LIGHTING UNIT

Filed Aug. 25, 1951    6 Sheets-Sheet 6

WITNESSES:
Robert C. Baird
Wm. L. Groome

INVENTOR
Willis A. Pennow.
BY
Arthur T. Stratton
ATTORNEY

United States Patent Office
2,773,172
Patented Dec. 4, 1956

2,773,172
LIGHTING UNIT

Willis A. Pennow, Cleveland, Ohio, assignor to Westinghouse Electric Corporation, East Pittsburgh, Pa., a corporation of Pennsylvania Application August 25, 1951, Serial No. 243,672

15 Claims. (Cl. 240—1.2)

This invention relates generally to lighting units, and more specifically to such a unit having a composite lens structure to provide directional asymmetric distribution of light from a single light source.

While not limited to any particular application, one important field of use for this invention is in lighting units for outlining an airport runway or landing strip, where bidirectional asymmetric distribution of light is desired, and for this field of use, the unit comprising this invention is of special utility.

Aside from conventional modes of achieving directional asymmetric distribution of light from a single source, by the use of conventional separate lenses for distribution in each direction, cylindrical lenses have been tried comprising either two separate inner and outer lenses, one to achieve vertical concentration and the other to impart lateral control, or a single lens having lateral control prisms on the inner surface and annular prisms on the outer surface for vertical concentration. Such cylindrical lenses while achieving a degree of control are limited as to the formation of definite light beams in one or more directions due to edge losses, high losses in inactive slopes of prism steps, and depressing effects resulting from attempting to turn the light rays in different angular directions at each point around the lens.

It is an object of this invention, therefore, to provide a novel form of unitary composite lens structure which is particularly efficient in producing one or more directional beams of light.

Another object of this invention is to provide a lighting unit having a novel substantially inverted cup-shaped transparent lens positioned over a light source, with the side wall of said lens including flat and cylindrical lens portions for controlling the distribution of light in different ways, respectively.

Another object of this invention is to provide a novel unitary lens structure having a continuous side wall which is a composite of flat and cylindrical lens portions.

A more specific object of this invention is to provide a novel, unitary lens structure for bidirectional asymmetric distribution of light from a single light source, comprising flat beam-forming lens portions and integral connecting cylindrical lens portions.

These and other objects of this invention will become more apparent upon consideration of the following detailed description of preferred forms of the invention, when taken in connection with the attached drawings, in which:

Fig. 7 is a partial vertical section of the composite lens shown in Figs. 1 to 6 and taken substantially on the line VII—VII of Fig. 1;

Fig. 8 is a partial horizontal section of a modified form of composite lens;

Fig. 9 is a horizontal section of a composite lens similar to that shown in Figs. 1 to 7 but illustrating a modified form of the invention.

Figure 1:
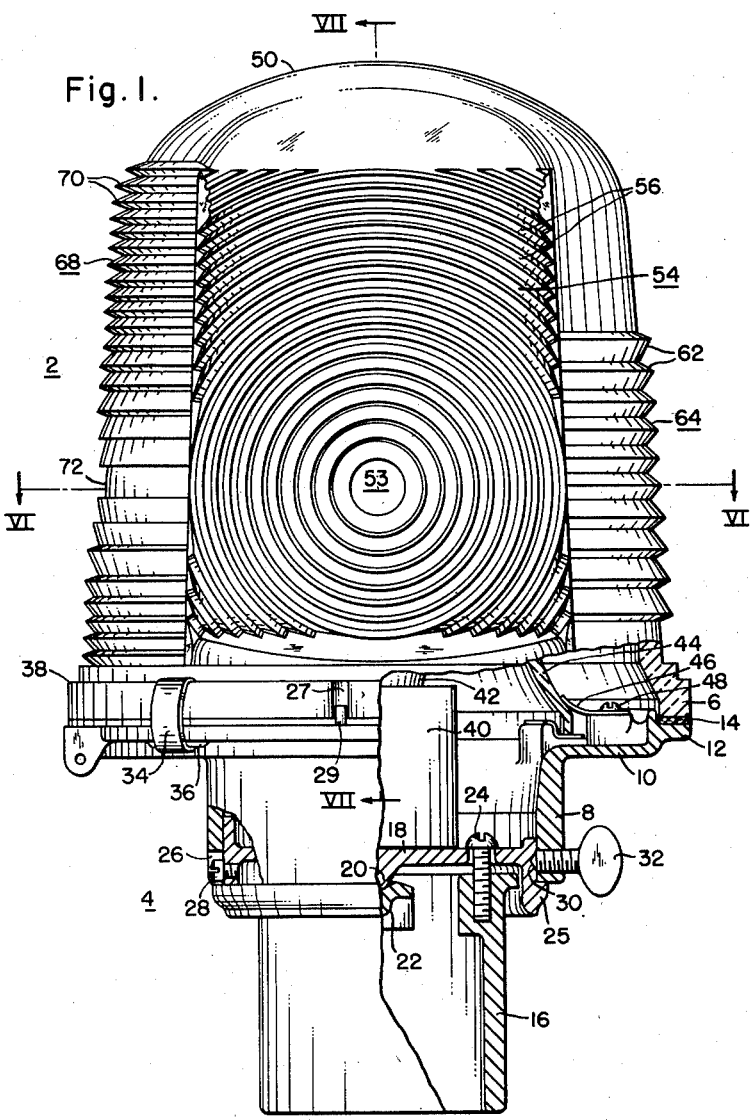
Figure 1 is a side elevation view partially in section illustrating a lighting unit embodying this invention.

The specific forms of this invention which are herein particularly described and illustrated are boundary lighting units adapted for use in marking the boundaries of an airport or the like. For this purpose it is desired that the unit be capable of projecting substantially opposed beams of light for defining a boundary line, with varying amounts of light being projected in the areas intermediate the bidirectional beams, there being a different distribution of light at one side (the runway side) than at the opposite side. It is also desirable that the lighting unit be visible in all directions at and above the ground level.

The lighting unit specifically depicted on the drawings comprises a composite lens 2 which is generally cylindrical in form with a closed top and open bottom, and in accordance with this invention, is constructed of one integral piece of light-transmitting material, such as glass or a synthetic transparent material. The composite lens 2 is adapted to be mounted on a lens support 4 which also supports a light source, and for this purpose the lens has a bottom peripheral flange 6 adapted to seat on a ledge 12, provided at the outside of a flange 10 on an upper supporting sleeve 8, with a moistureproof packing material 14 preferably interposed between the flange 6 of the lens and ledge 12 of the support.

The lens support 4 further includes a lower tubular portion 16 which supports an adjustable supporting disk 18 at its upper end, by means of a transversely extending supporting strut 22 having a depression located in its upper surface substantially centrally thereof for receiving a central projection 20 on the lower surface of supporting disk 18, so that the supporting disk may have limited movement in any direction. This enables adjustment of supporting disk 18 by screws 24 (only one of which is shown) for the purpose of leveling the disk, and consequently the composite lens and light source.

The upper supporting sleeve 8 is mounted on the adjustable supporting disk 18, with the lower end of the sleeve seated on a supporting shoulder 25 on the outside of disk 18. The composite lens is positioned in predetermined relation about a vertical axis by one or more notches 26 formed in the lower edge of upper supporting sleeve 8, which are slipped over positioning screws 28, preferably staked in the adjustable supporting disk 18. The upper supporting sleeve 8 is then secured in position by a single thumb screw 32, which is threadedly engaged in an opening in supporting sleeve 8, and engages a locking recess 30 in the adjustable supporting disk 18.

The composite lens 2 is secured to the upper supporting sleeve 8 by a plurality (only one being shown) of substantially U-shaped spring clips 34, which may be sprung into place by first engaging the lower ends thereof behind integral lugs 36 formed on the under surface of ledge 12, and then having their upper ends sprung over the top 38 of flange 6 on the lens itself. The lens 2 has notches 27 in its flange 6 for receiving projections 29 on the ledge 12 of the upper supporting sleeve, to properly locate the lens on supporting sleeve 8.

It can thus be seen that the lens 2 is readily securable to and detachable from the lens support 4 by simply removing or applying the spring clips 34, which may be done without the use of any special tools. When the lens is removed, adjustment of the adjusting screws 24 can be made since they are accessible from the top of lens support 4. Alternatively, the upper supporting sleeve 8 and lens 2 when mounted thereon may be removed merely by loosening the single thumb screw 32, to thus obtain access to leveling screws 24 and the light source.

The light source may comprise any suitable lamp 42, which is adapted to be supported in a lamp socket 40 mounted on the adjustable supporting disk 18 so that any adjustment of the latter will automatically adjust not only the composite lens 2 but the light source as well.

If desired, a colored light filter 44, also preferably of inverted cup-shaped form may be mounted within lens 2 over the light source, and held in place on the flange 10 of upper supporting sleeve 8 of lens support 4 by a plurality (only one being shown) of spring retaining strips 46 secured to the flange 10, as by a screw 48. In some cases it may also be desirable to have an opaque shield for one side of the lens, and this too may be supported on flange 10 of the upper supporting sleeve at any desired location about the light source within lens 2.

The composite lens 2 comprising this invention is, as previously pointed out, of integral construction composed of a single piece of transparent material, including a substantially dome-shaped top 50 having light-dispersing and reflecting formations on the inner surface thereof, preferably comprising a roughened inner surface 51 (Figs. 5 and 7) to reflect the major portion of the light impinging on this top surface.

Figure 2:
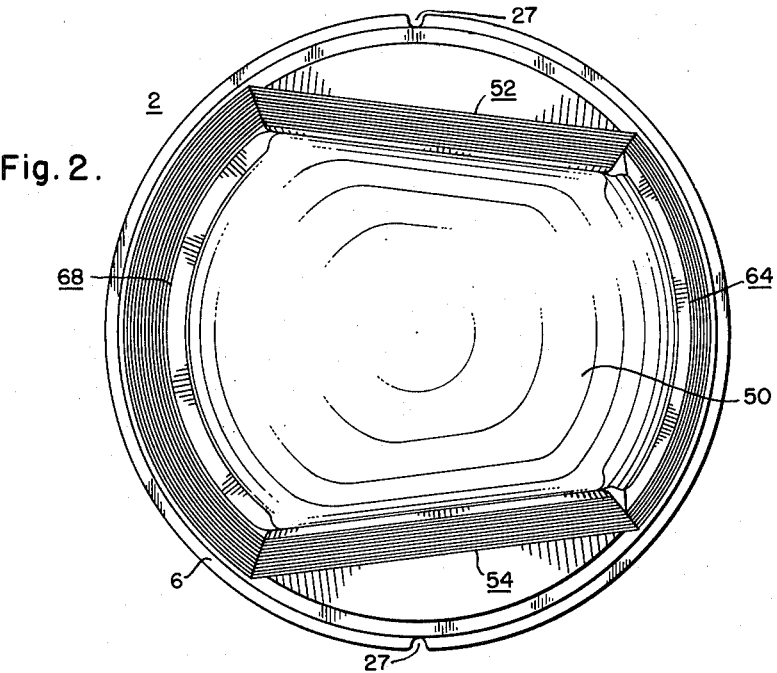
Fig. 2 is a top view of the lighting unit shown in Fig. 1.
Figure 3:
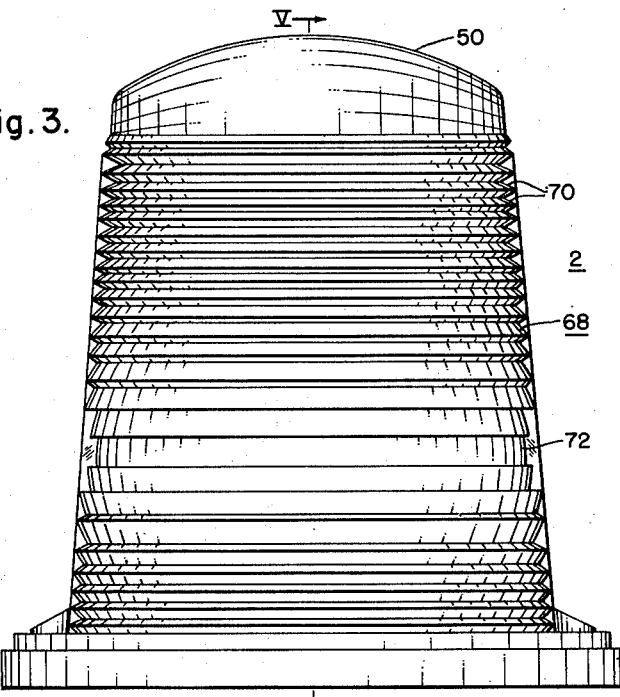
Fig. 3 is a side elevation view looking at the left side of the composite lens shown in Figs. 1 and 2.

Substantially at opposite sides of the composite lens 2 there are opposed flat surfaces 52 and 54 connected by intermediate cylindrical surfaces comprising a relatively short side 64 and a longer cylindrical side 68. The purpose of the flat side surfaces 52 and 54 is to provide flat lenses for directional light beams in the most efficient manner, and while they may be disposed precisely opposite one another, preferably they are not parallel but are displaced at an angle corresponding to the desired angle of the emitted beam (see Figs. 2 and 6). Of course, if the flat sides 52 and 54 were positioned precisely opposite each other, the cylindrical sides 64 and 68 would then be equal length.

On each of the flat sides 52 and 54, there are formed on the outer surface concentric circular prisms 56 about a convex lens portion 53, to provide a bull's-eye or circular type of Fresnel lens. The prisms 56 are formed with the side surfaces thereof shaped so that a beam of light emerges therefrom of either cylindrical or cone-shaped form. By reference to Fig. 6, it will be observed that light rays, such as the rays A, $A^1$, $A^2$, and $A^3$, from the light source which are transmitted through the flat sides 52 and 54, respectively, will be turned in a horizontal plane in passing through the prisms formed on these side surfaces, so that substantially all of them will be emitted in a direction substantially at right angles to these side surfaces. Similarly, by referring to Fig. 7, it will be observed that the light rays, such as $A^4$, $A^5$, and $A^6$, emitted from the light source will be deflected in a vertical plane by the prisms on the flat side lenses 52 and 54 and emitted therefrom in a direction substantially at right angles to these lens surfaces. A pencil type beam is thus emitted from flat sides 52 and 54 consisting of substantially parallel light rays. Furthermore, by having prisms 56 formed on the flat surfaces 52 and 54, which in effect comprise chordal portions of the cylindrical portions 64 and 68, they are brought closer to the light source so that each unit of area thereof intercepts direct light over a larger angle than would be the case with a circular lens portion.

Each unit of area of the flat lens portions thus accepts more light than each unit of area of a circular lens portion subtending the same chord, and can be used to direct this greater amount of light. In addition, beam directing prisms can be made more accurately on a flat surface to obtain better control of the light, particularly at the outer edges of the beam, than on a curved surface. For all of these reasons, a more efficient beam of greater strength is obtained.

Figure 5:
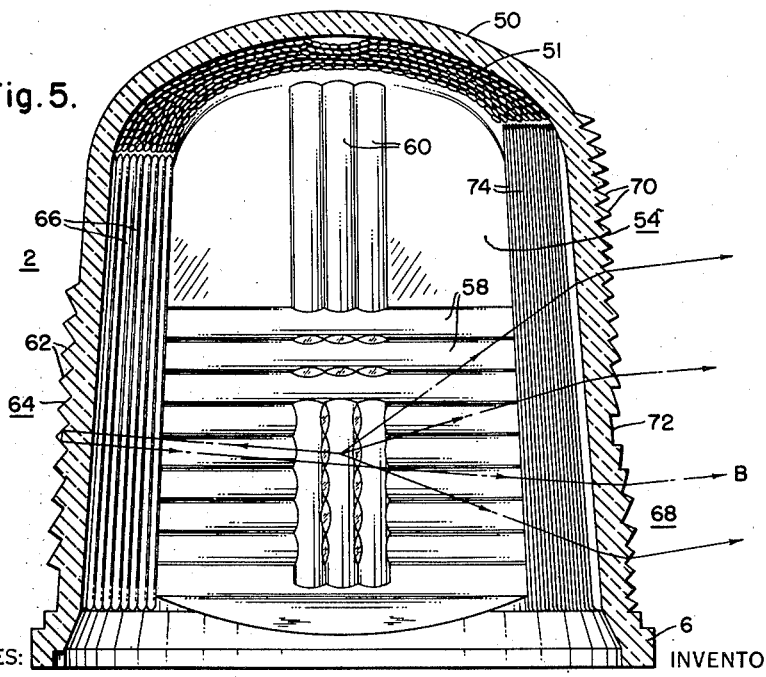
Fig. 5 is a substantially central vertical cross section of the composite lens shown in Fig. 1 taken substantially on the line V—V of Fig. 3.
Figure 6:
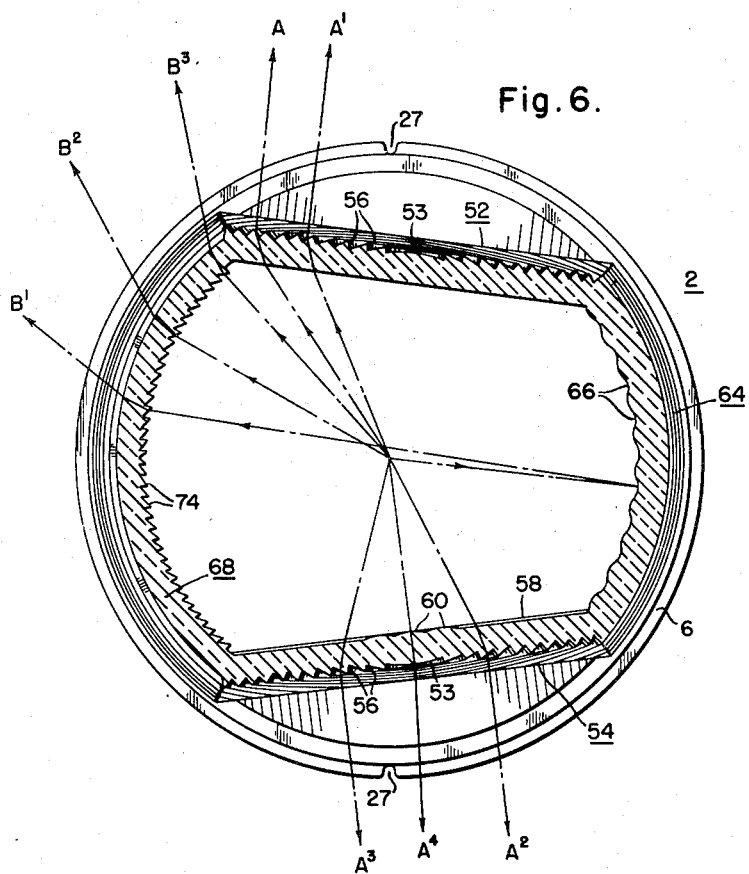
Fig. 6 is a substantially horizontal cross-section view of the composite lens only shown in Figs. 1 to 5, taken substantially on the line VI—VI of Fig. 1.

In order to break up the source image which otherwise might be visible, the inner surface of flat sides 52 and 54 may be provided with shallow flutes 58 and 60 which are non-reentrant with respect to the inner surface of the flat sides, as shown in Figs. 5 and 6 for the side 54. The flutes 58 extend substantially horizontally, and flutes 60 extend in a vertical direction. Reference to the ray traces shown in Fig. 6 will demonstrate how these flutes act to slightly disperse the light rays passing therethrough to thus break up the source image without materially affecting the beam emitted from the lenses formed on these surfaces 52 and 54. Thus, ray $A^4$ is a few degrees away from a 90° relation with side 54.

Figure 4:
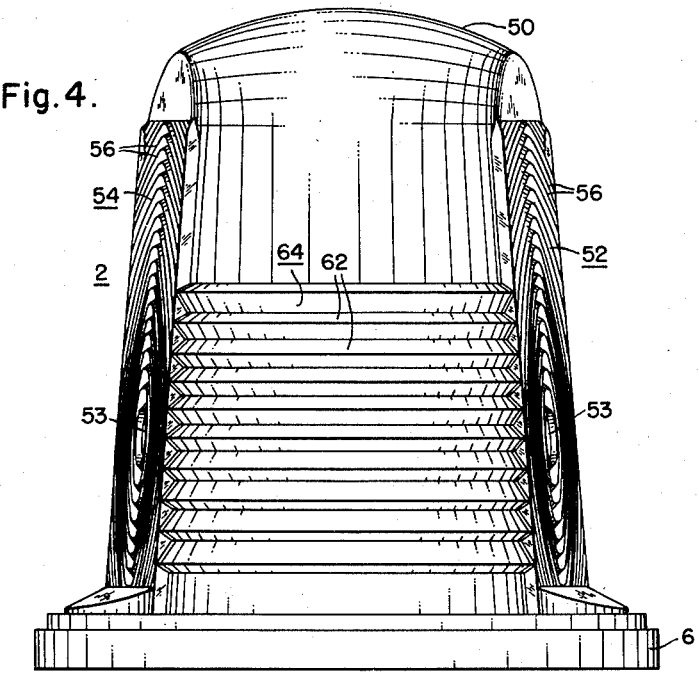
Fig. 4 is also a side elevation view of the composite lens shown in Figs. 1 and 2, but is taken looking at the right side of the lens.

In the particular type of lighting unit illustrated, namely a unit for runway lighting, the main purpose, as the name implies, is not to illuminate the runway itself but to outline the boundary thereof. Accordingly, in the form of composite lens 2 herein specifically illustrated, the short cylindrical side 64 is intended for positioning facing the runway, and it has on its outer surface a number of prisms 62 positioned in a horizontal plane which may, as shown in Figs. 1, 4, and 5, be for the purpose of reflecting the major portion of the light impinging on this side of the lens back into the lens, with most of it emerging from the opposite side as shown by the ray traces B and $B^1$ of Figs. 5 and 6. It will also be noted that the arrangement is such that a direct ray from the light source will be reflected in both the horizontal and vertical directions in a manner such that the reflected ray avoids hitting the light source. When used for reflecting purposes, the prisms 62 formed on the outer surface of short side 64 of the lens are located as shown, over the lower portion of the short side 64. Thus, as shown in Figs. 1 and 4, the prisms 62 extend from a point near the bottom of composite lens 2 to a point spaced below the top of the lens. At the inner surface of the short cylindrical side 64 of the lens, vertical flutes 66 may be provided principally for the purpose of deflecting the reflected ray $B^1$ in a horizontal direction (Fig. 6) to avoid the light source.

The relatively long cylindrical side 68 of the composite lens has Fresnel type prisms 70 formed on the outer surface therof at opposite sides of a convex lens section 72 which is located substantially opposite the light source. The prisms 70 and lens section 72 are horizontally disposed and of circular form following the curvature of the long cylindrical side 68. The purpose of prisms 70 and lens section 72 is to provide a generally flat beam of light in a horizontal direction, and the inner surface of side 68 may be provided with vertical prisms 74 to provide a wide horizontal dispersion of light rays, as indicated by the ray traces $B^1$, $B^2$, and $B^3$ shown in Fig. 6.

Figure 10:
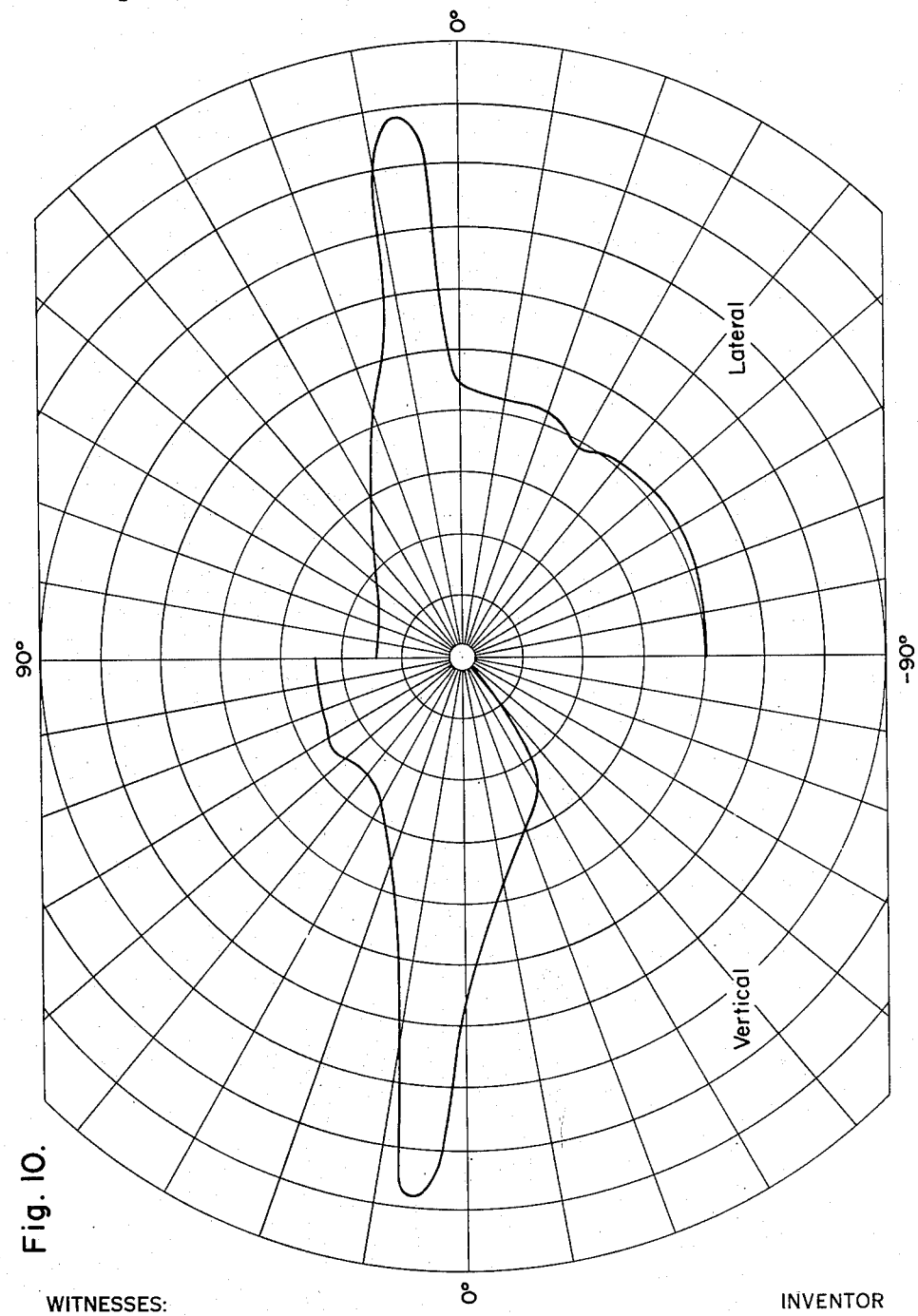
Fig. 10 shows one half of each of the horizontal and vertical light distribution curves obtainable with the composite lens structures shown in Figs. 1 to 9.

It can now be observed that an asymmetric light distribution is obtained with the composite lens 2, comprising generally opposed beams of light from the flat sides 52 and 54 adapted to be directed in opposite directions in a horizontal plane, with a relatively small amount of light being transmited through the short cylindrical side 64 which would be the side facing the runway, and with a generally flat horizontal field of light distribution at the opposite longer cylindrical side 68 of the lens in a relatively wide horizontal field. This distribution is apparent from the ray traces shown in Figs. 5, 6, and 7 and the light distribution curves shown in Fig. 10. The curves shown in Fig. 10 comprise one-half of the horizontal candle power distribution curve shown in the upper part of this figure, and one-half of the vertical candle power distribution curve shown at the bottom part of this figure. A beam of light emanating from the flat side 52 or 54 is readily apparent from inspection of Fig. 10 to comprise a relatively thin pencil-like beam toed in horizontally at an angle corresponding to the angle which flat sides 52 and 54 are toed in, as shown in the upper or "lateral" portion of the curve. The beam is also shown to be at a slight upward angle, corresponding to the angle sides 52 and 54 make with the vertical, and shown by the lower or "vertical" portion of the curve. Similarly, the horizontal more or less pancake-shaped distribution from the relaitvely long cylindrical side 68, is apparent from the extension to the right of the lower portion of the upper curve with a relatively small amount of light being distributed from the shorter cylindrical side 64, as indicated by the lower portion of the upper curve at the left. It will also be observed from the upper left hand portion of the "vertical" distribution curve that an appreciable amount of light will be transmitted through the top 50 of the lens unit, so that light is transmited through and visible at all points at and above ground level with the composite lens 2 comprising this invention. An important feature of the invention, which is of particular utility and advantage, is that this lens construction provides a blending of the light transmitted through the cylindrical sides 64 and 68 of the lens with the beams transmitted through the flat side lens portions 52 and 54. This is accomplished while achieving maximum efficiency in directional control due to the use of flat side panels 52 and 54, and at the same time achieving asymmetrical control in all other directions by means of a single one-piece composite lens.

In Fig. 8 a modification is shown with respect to the flat side lens portions, with the lens 76 shown in this figure having opposed flat sides 78 (only one being shown), which are formed on their outer surfaces with bull's-eye or Fresnel type prisms 80, as in the embodiment of the invention previously described, but being additionally formed with vertical turning prisms 82 on the inner surfaces, for the purpose of turning the light rays to provide a more nearly 180° relation of the opposed light beams emanating from the flat sides 78 of this composite lens, while at the same time permitting the same amount of light flux to impinge on the long cylindrical portion 79. Thus, rays C, C¹, and C² are inclined to the left as viewed in Fig. 8 from 90° relation with respect to flat side 78. Obviously, the prisms 82 may be arranged to turn the light rays in either direction from a line drawn perpendicular to the surface of a flat side 78, to thereby adjust the angular relationship between the bidirectional beams without altering the amount of light flux impinging on either of the cylindrical portions 79 or 81.

A further modified form of lens is shown in Fig. 9, wherein the lens 84 there depicted is similar to the lenses previously described, in that it has substantially opposed flat side surfaces 86 and 87, with a relatively short connecting curved or cylindrical side 92 at one end, and a relatively long connecting curved or cylindrical side 96 at the other end. The lens 84 has the flat sides 86 and 87 thereof provided with concentric Fresnel type prisms 88 on the outer surfaces thereof to form bull's-eye lens portions as in the previously described embodiments of this invention, and have turning prisms 90 on the inner surfaces thereof, as in the embodiment of the invention described in connection with Fig. 8 of the drawings.

The short cylindrical side 92 of lens 84 is not provided with reflecting prisms on the outer surface thereof as in the previously described embodiments of this invention, but may merely have a plain surface, or horizontally disposed grooves and ridges 94 which have no special optical function, but are primarily for the purpose of appearance. The relatively long cylindrical side 96, however, is provided with Fresnel type prisms 98 which may be similar to the prisms 70 in the previously described embodiments of the invention.

The essential difference in lens 84 resides in the inner surfaces of the two cylindrical sides 92 and 96, in that each is provided with a plain inner surface at least at the central part thereof. The short cylindrical side 92 has the major part of its inner surface devoid of projections, there being provided solely at each end a few turning prisms 102 merely for the purpose of providing wider dispersion at the ends to obtain better blending with the beams of light emitted from the flat sides 86 and 87. The longer cylindrical side 96 has a relatively short plain surface 101 at the center thereof which has greater concavity than the normal inner surface of this side, with a number of turning prisms 100 at each side. The prisms 100 and 102 extend vertically, with the prisms 100 facilitating the wide flat distribution of light from the side 96 of the lens.

The particular formation of the inner curved surfaces of the lens 84 shown in Fig. 9 of the drawings is especially adapted for use with a lamp of the type having a flat filament, positioned with the edges of the filament opposed to curved sides 92 and 96, respectively, and with the flat sides of the filament disposed substantially opposite the flat sides 86 and 87 of the lens, respectively.

It will now be apparent that the light unit comprising this invention provides for asymmetric bidirectional light distribution from a single light source, by the provision of a composite integral and unitary lens having flat and cylindrical sides, to thus eliminate losses and provide a maximum of efficiency while retaining visibility in all directions. Moreover, while this is specifically herein described and illustrated in the form of a runway lighting unit for airports and the like, wherein it has particular features of advantage, it will be apparent that it may be applied to other types of lighting units where asymmetric light distribution is desired, either unidirectional or multi-directional in character. Accordingly, while the present preferred form has been specifically illustrated and described in accordance with the patent statutes, the invention is not limited to this particular form and design, as it will be apparent to persons skilled in the art that the invention may take other specific forms and may be employed for other applications wherein one or more of the advantages and features thereof may be employed with particular advantage.

I claim as my invention:

1. A lighting unit comprising a light source, a one-piece tubular transparent lens surrounding said light source and comprising substantially opposed flat lens portions and intermediate curved lens portions connecting said flat lens portions at opposite sides, respectively, said flat lens portions comprising chordal portions with respect to said curved lens portions so as to be closer to the light source than a cylindrical portion subtended thereby, to thus accept a larger angle of light per unit of area at all points between the sides thereof, said flat lens portions having concentric prisms formed thereon so as to project opposed pencil type beams of light, and said curved lens portions having non-circular prisms formed on both inner and outer surfaces thereof to transmit light therethrough in a different manner.

2. A lighting unit comprising a light source, a tubular one-piece transparent lens surrounding said light source and comprising a substantially cylindrical lens portion and at least one flat lens portion forming a chordal portion of said cylindrical portion so as to be closer to the light source than a cylindrical portion subtended thereby, and thus accept a larger angle of light per unit of area at all points between the sides thereof, said flat lens portion having concentric circular light concentrating prisms thereon to project a pencil type beam of light from said source, and said cylindrical lens portion having a non-circular prism formation on both inner and outer portions thereof for supplementary asymmetric control of light transmitted therethrough from said source.

3. A lighting unit comprising, a light source, a one-piece transparent lens surrounding said light source and comprising substantially opposed flat lens portions and intermediate curved lens portions, said flat lens portions comprising chordal portions with respect to said curved lens portions so as to be closer to the light source than a cylindrical portion subtended thereby, to thus accept a larger angle of light per unit of area at all points between the sides thereof, said flat lens portions having concentric circular light concentrating prisms thereon to project a pencil type beam of light from said source, and said curved lens portions having longitudinally extending parallel prisms formed on inner surfaces thereof for supplementary control of light transmitted thereto from said source, and said curved lens portions also having circumferential prism formations on outer surfaces thereof providing for further control of light accepted thereby from said source.

4. A lighting unit comprising, a light source, a one-piece transparent lens surrounding said light source and comprising substantially opposed flat lens portions and intermediate curved lens portions, said flat lens portions having concentric circular light concentrating prisms thereon to project a pencil type beam of light from said source, and said curved lens portions having prisms formed thereon for supplementary asymmetric control of light transmitted therethrough from said source, one of said curved lens portions having prisms formed thereon to project a relatively wide flat beam of light extending between the pencil type beams, and the other of said curved lens portions having reflecting prisms formed thereon to reflect a major part of the light it receives from said source to another of said lens portions.

5. A lighting unit comprising, a light source a one-piece transparent lens surrounding said light source and comprising a substantially cylindrical lens portion and at least one flat lens portion, said flat lens portion having concentric circular light concentrating prisms thereon to project a pencil type beam of light from said source, and said cylindrical lens portion having prisms formed thereon for supplementary asymmetric control of light transmitted therethrough from said source, one part of said cylindrical lens portion having prisms formed thereon to project a relatively flat beam of light extending away from said pencil type beams, and another part of said circular lens portion having reflecting prisms formed thereon to reflect a major part of the light it receives from said source to another part of said lens.

6. A lighting unit comprising, a light source, a one-piece transparent lens of cup-shaped form positioned over said source, the side wall of said lens having at least one flat portion formed to project a beam of light from said source in a predetermined direction, the side wall of said lens also having a curved portion at each side of said flat portion, light directing prism means on one of said curved portions for distributing light from said source in a different fashion, light reflecting prism means on the other of said curved portions, and light directing means on substantially all of the remaining portions of said lens.

7. A lighting unit comprising, a light source, a one-piece transparent lens of cup-shaped form positioned over said source, the side wall of said lens having at least one flat portion formed to project a beam of light from said source in a predetermined direction, said lens also having a curved portion at each side of said flat portion, light directing prism means on one of said curved portions for distributing light from said source in a different fashion, light reflecting prism means on the other of said curved portions and the top of said lens, and light directing means on substantially all of the remaining portions of said lens.

8. A lighting unit comprising, a light source, a one-piece transparent lens of cup-shaped form positioned over said source, the side wall of said lens comprising opposed flat portions connected by opposed curved portions, said flat portions having circular concentric prisms formed thereon for projecting light beams in opposite directions, light directing prism means on one of said curved sides for distributing light from said source in a different fashion, light reflecting prism means on the other of said curved sides, and light directing means on substantially all of the remaining portions of said lens.

9. A lighting unit comprising, a light source, a one-piece transparent lens of cup-shaped form positioned over said source, the side wall of said lens comprising opposed flat portions connected by opposed curved portions, said flat portions having circular concentric prisms formed thereon for projecting light beams in opposite directions, light directing prism means on one of said curved sides for distributing light from said source in a different fashion, light reflecting means on the other of said curved sides and the top of said lens, and light directing means on substantially all of the remaining portions of said lens.

10. A lens comprising, transparent material generally cup-shaped in form, the side wall of said lens having at least one flat surface formed with circular concentric prisms for projecting a beam of light in a predetermined direction, said side wall having curved surfaces at each side of said flat surface, light directing prism means on one of said curved surfaces for distributing light from said source in a different fashion, light reflecting prism means on the other of said curved surfaces, and light directing means formed on substantially all remaining surfaces of said side wall and the closed end of said lens.

11. A lighting unit comprising, a light source, a one-piece tubular transparent lens surrounding said light source and comprising opposed flat lens portions connected by cylindrical lens portions at each side, said flat lens portions having concentric circular prisms formed thereon for projecting a beam of light from said source, one of said cylindrical portions having two sets of circumferential prisms on the outside surface thereof with the prisms in said sets facing in opposite directions to project a relatively narrow radial beam of light therethrough, and longitudinally extending turning prisms on the interior surface of said one cylindrical portion for spreading said beam out fan-wise and to blend smoothly with the beams projected by said flat portions.

12. A lighting unit comprising, a light source, a tubular transparent lens surrounding said light source and comprising at least one flat lens portion and integral curved lens portions at opposite sides thereof, said flat lens portion having concentric circular light concentrating prisms on the outer surface thereof to project a beam of light from said source, and said curved lens portions having turning prisms on the inner surfaces thereof at least adjacent said flat surface prisms for turning light rays passing therethrough toward the beam emanating from said flat side to smoothly blend light emanating from said flat and curved portions at the side edges of said flat portion.

13. A lighting unit comprising, a light source, a tubular transparent lens surrounding said source comprising integral flat and curved lens portions, said flat lens portion having concentric circular light concentrating prisms on the outer surface thereof to project a beam of light from said source, and shallow non-reentrant flutes on the inner surface thereof to break up the source image.

14. A lighting unit comprising, a light source, a tubular transparent lens surrounding said light source and comprising at least one flat lens portion and an integral curved lens portion at least at one side thereof, said flat lens portion having concentric circular light concentrating prisms on the outer surface thereof to project a beam of light from said source, and said curved lens portion having turning prisms on the inner surface thereof at least adjacent said flat surface prisms for turning light rays passing therethrough toward the beam emanating from said flat side to smoothly blend light emanating from said flat and curved portions at their adjoining side edges.

15. A lighting unit comprising, a light source, a one-piece transparent lens surrounding said light source and comprising substantially opposed flat lens portions and intermediate curved lens portions, said flat lens portions having concentric circular light concentrating prisms thereon to project a pencil type beam of light from said source, and said curved lens portions having prisms formed thereon for supplementary asymmetric control of light transmitted therethrough from said source, one of said curved lens portions having prisms formed thereon to project a relatively wide flat beam of light extending between the pencil type beams, and the other of said curved lens portions having reflecting means thereon to reflect a major part of the light it receives from said source to another of said lens portions.

References Cited in the file of this patent

UNITED STATES PATENTS

| | | |
|---|---|---|
| 1,635,372 | Lippert | July 12, 1927 |
| 1,834,041 | Bartow | Dec. 1, 1931 |
| 1,941,079 | Exelmans | Dec. 26, 1933 |
| 2,021,611 | Rolph | Nov. 19, 1935 |
| 2,133,377 | Cullman | Oct. 18, 1938 |
| 2,133,378 | Cullman | Oct. 18, 1938 |
| 2,170,912 | Rolph | Aug. 29, 1939 |
| 2,332,362 | Bartow | Oct. 19, 1943 |
| 2,375,311 | Meyers | May 8, 1945 |
| 2,486,754 | Miles | Nov. 1, 1949 |

FOREIGN PATENTS

| | | |
|---|---|---|
| 8,585 | Great Britain | Apr. 11, 1913 |
| 492,626 | Great Britain | Sept. 23, 1938 |